United States Patent
Tang et al.

(10) Patent No.: US 10,556,773 B2
(45) Date of Patent: Feb. 11, 2020

(54) PULL-OUT TYPE CORD WINDING MODULE

(71) Applicant: Qingdao GoerTek Technology Co., Ltd., Qingdao, ShanDong Province (CN)

(72) Inventors: Mingjun Tang, Qingdao (CN); Zhongli Cao, Qingdao (CN)

(73) Assignee: Qingdao GoerTek Technology Co., Ltd. (CN)

( * ) Notice: Subject to any disclaimer, the term of this patent is extended or adjusted under 35 U.S.C. 154(b) by 0 days.

(21) Appl. No.: 16/074,624

(22) PCT Filed: Aug. 29, 2016

(86) PCT No.: PCT/CN2016/097183
§ 371 (c)(1),
(2) Date: Aug. 1, 2018

(87) PCT Pub. No.: WO2018/032533
PCT Pub. Date: Feb. 22, 2018

(65) Prior Publication Data
US 2019/0337755 A1    Nov. 7, 2019

(30) Foreign Application Priority Data
Aug. 18, 2016    (CN) .......................... 2016 1 0694227

(51) Int. Cl.
*B65H 75/48*    (2006.01)
*F16D 41/12*    (2006.01)
*B65H 75/44*    (2006.01)

(52) U.S. Cl.
CPC ............. *B65H 75/48* (2013.01); *F16D 41/12* (2013.01); *B65H 75/4431* (2013.01);
(Continued)

(58) Field of Classification Search
CPC ............... B65H 75/48; B65H 2701/34; B65H 75/4431; B65H 2701/3919; B65H 2555/13; F16D 41/12
See application file for complete search history.

(56) References Cited

U.S. PATENT DOCUMENTS 3,378,214 A    4/1968    Hilsinger, Jr.
3,528,624 A *  9/1970    Tamarin ............. B65H 75/4434
                                                    242/385.1
(Continued)

FOREIGN PATENT DOCUMENTS

CN        2444084 Y      8/2001
CN      101234039 A      8/2008
(Continued)

OTHER PUBLICATIONS

European Search Report which issued in connection with corresponding European Application No. 16913289.1 dated Nov. 28, 2018.

*Primary Examiner* — William A. Rivera
(74) *Attorney, Agent, or Firm* — Clark Hill PLC; James R. Foley

(57) ABSTRACT

A magnetic attraction type cord winding module, comprising a rotary wheel (9) on which a cord (10) is wound and a stop button (4) working cooperatively with the rotary wheel (9). The cord winding module further comprises at least one pair of magnet blocks, and the at least one pair of magnet blocks comprise a first magnet (3) disposed on the stop button (4) and a second magnet (5) disposed on the rotary wheel (9). The stop button (4) automatically brakes the rotary wheel (9) under the action of an attractive force or a repulsive force of the magnet blocks and prevents the rotary wheel (9) from retracting the cord (10). The magnet block disposed on the stop button (4) does not protrude from the
(Continued)

upper surface of the stop button (4), and the magnet block disposed on the rotary wheel (9) is flattened.

9 Claims, 4 Drawing Sheets

(52) U.S. Cl.
CPC ...... *B65H 2555/13* (2013.01); *B65H 2701/34* (2013.01); *B65H 2701/3919* (2013.01)

(56) References Cited

U.S. PATENT DOCUMENTS

| 3,848,827 | A |   | 11/1974 | Tamarin |
| 4,901,938 | A | * | 2/1990 | Cantley ................. B65H 75/44 |
|  |  |  |  | 242/378.1 |
| 5,060,977 | A | * | 10/1991 | Saito ..................... B60R 22/023 |
|  |  |  |  | 200/61.45 M |
| 2003/0057047 | A1 |   | 3/2003 | Jin |
| 2005/0155830 | A1 |   | 6/2005 | Huang |
| 2013/0153701 | A1 |   | 6/2013 | Huang et al. |

FOREIGN PATENT DOCUMENTS

| CN | 201914787 U | 8/2011 |
| CN | 102266212 A | 12/2011 |
| CN | 103130043 A | 6/2013 |
| CN | 103159090 A | 6/2013 |
| CN | 103457591 A | 12/2013 |
| CN | 204050774 U | 12/2014 |
| CN | 104839110 A | 8/2015 |
| CN | 105680260 A | 6/2016 |
| JP | 2001-091806 A | 4/2001 |
| KR | 101292337 B1 | 8/2013 |
| TW | 340532 U | 9/1998 |

* cited by examiner

PULL-OUT TYPE CORD WINDING MODULE

CROSS REFERENCE TO RELATED APPLICATIONS

This application is a U.S. National Stage entry under 35 U.S.C. § 371 based on International Application No. PCT/CN2016/097183, filed on Aug. 29, 2016, which was published under PCT Article 21(2) and which claims priority to Chinese Patent Application No. 201610694227.X, filed on Aug. 18, 2016. The disclosure of the priority applications are hereby incorporated herein in their entirety by reference.

TECHNICAL FIELD

The present disclosure relates to a magnetic attraction type cord winding module for receiving a cord or a signal wire of an electronic device.

BACKGROUND

Auxiliary devices having cords, such as earphones, mice, keyboards, etc., are used in many electronic devices. In order to use more conveniently, cord winding modules have been increasingly provided in these auxiliary devices for receiving cords or signal wires. The cord winding module typically comprises a rotary wheel, a coil spring and a stopper structure. The cord is wound on the rotary wheel, and can be automatically retracted under the elastic restoring force of the coil spring. In the retracting process, the stopper structure can prevent the rotary wheel from rotating and stop the retracting of the cord, so that a suitable length of the cord that has not been retracted can be reserved.

The stopper structure comprises a stop button and an elastic support device. The elastic support device can provide an elastic force to the stop button, and the stopper structure automatically brakes the rotary wheel under the action of the elastic force. If the stop button is pressed, the rotary wheel will be released, and the retraction of the cord will be started again.

The stopper structures of the cord winding modules on the market are elastically supported by a compression spring or a torsion spring structure. Such a structure occupies a lot of space, which limits the miniaturization of the products.

For example, a Chinese invention patent titled "Accommodation Device" (Application No.: 201110267313.X) discloses a stopper structure of a cord winding module, in which a spring 415 is an elastic support device of a locking device 400. As shown in FIG. 4 and FIG. 5, the spring 415 is a compression spring and has a certain height. Thus, a second chamber is specially provided on a mounting portion 230 to accommodate the spring 415, and it occupies a large space.

A Chinese invention patent titled "Accommodation Device" (Application No. 201110417406.6) discloses a stopper structure of a cord winding module, in which an elastic member 420 is an elastic support device of a lock assembly 400. As shown in FIG. 4 and FIG. 5, the elastic member 420 is a compression spring and has a certain height. Thus, a fixing groove 444 is specially provided on a fixing member 440 to accommodate the elastic member 420, and it occupies a large space.

A Chinese utility model patent "Headphone Cord Winding-up Device, Headphone Assembly and Mobile Terminal" (Application No. 200920108072.2) discloses a stopper structure of a cord winding module, in which a hook spring 13 is an elastic support device of a hook plate 12. As shown in FIG. 1, the hook spring 13 is a torsion spring and has a certain height. Thus, a fixing slot is provided at the side of a base 8 to install the hook spring 13, and it also occupies a large space.

SUMMARY

In view of the above problems, the present disclosure provides a magnetic attraction type cord winding module, comprising a stopper structure in which mutually attractive or repulsive magnet blocks work cooperatively with a stop button. The magnetic attraction type cord winding module can effectively reduce the height of the stopper structure and thus reduce the space to be occupied, thereby reducing the size of the cord winding module.

The technical solutions of the present disclosure are as follows.

A magnetic attraction type cord winding module, comprising a rotary wheel on which a cord is wound and a stop button working cooperatively with the rotary wheel, wherein the cord winding module further comprises at least one pair of magnet blocks, the at least one pair of magnet blocks comprise a first magnet disposed on the stop button and a second magnet disposed on the rotary wheel, and the stop button automatically brakes the rotary wheel under the action of an attractive force or a repulsive force of the magnet blocks and prevents the rotary wheel from retracting the cord.

In some embodiments, the cord winding module further comprises a second pair of magnet blocks, the second pair of magnet blocks comprise a third magnet disposed on the stop button and a fourth magnet disposed on the rotary wheel, and the third magnet and the fourth magnet generate a repulsive force or an attractive force.

In some embodiments, when the magnet blocks attract, opposite magnetic poles oppose each other, and when the magnet blocks repel, like magnetic poles oppose each other; and interaction surfaces of the magnet blocks are flat.

In some embodiments, the magnet blocks are rectangular blocks or cylinders.

In some embodiments, the cord winding module further comprises a fixing cover, the rotary wheel is installed under the fixing cover, the stop button is installed at a side of the fixing cover, one or two receiving grooves for mounting corresponding magnet blocks are provided on the body of the fixing cover, and the receiving grooves have a notch, and one end of the magnet blocks mounted in the receiving grooves is exposed from the notch.

In some embodiments, the stop button is a lever structure, a mounting hole is disposed in the middle of the stop button, the mounting hole is engaged with a pin to mount the stop button at a side of the fixing cover, the stop button rotates around the pin, and one or both ends of the stop button are provided with a U-shaped member or U-shaped members for mounting corresponding magnet blocks.

In some embodiments, the stop button is a metal lever, and the U-shaped member is integrally formed.

In some embodiments, a ratchet to cooperate with the stop button is mounted on an upper end of the rotary wheel, a shaft hole is provided in the middle of the rotary wheel, and a rotating shaft is fixed on the fixing cover; and the rotary wheel rotates around the rotating shaft, a snap ring is arranged at a lower end of the rotating shaft, and the rotary wheel is limited on the rotating shaft by the snap ring.

In some embodiments, when the magnet blocks attract, the stop button is engaged with the ratchet through the U-shaped member.

In some embodiments, the cord winding module further comprises a pair of mutually repulsive magnet blocks, and a ratchet pawl is provided on the other end of the stop button to engage with the ratchet.

In some embodiments, the ratchet pawl has a plastic sleeve.

In some embodiments, a mounting slot is provided at the upper end of the rotary wheel;

a circuit connection elastic piece is disposed in the mounting slot;

an FPC connection terminal is provided on the lower surface of the fixing cover;

one end of the circuit connection elastic piece is connected to the cord, and the other end is connected to the FPC connection terminal; and the circuit connection elastic piece is driven by the rotary wheel to rotate with respect to the FPC connection terminal.

In some embodiments, the FPC connection terminal has a ring shape and is connected with an external flexible printed circuit board;

the circuit connection elastic piece is two circuit connection elastic pieces which are symmetrically arranged and in contact with the FPC connection terminal; and the rotary wheel applies a preload to the FPC connection terminal through the circuit connection elastic pieces.

In some embodiments, the ends of the circuit connection elastic pieces which are in contact with the FPC connection terminal have a fork structure and an arc segment, and the circuit connection elastic pieces are connected to the FPC connection terminal through the arc segments.

In some embodiments, an energy storage chamber is provided at the lower end of the rotary wheel;

a coil spring is installed in the energy storage chamber, one end of the coil spring is fixed on the rotating shaft, and the other end is fixed on the sidewall of the energy storage chamber; and when the cord is pulled out, the rotary wheel rotates to tighten the coil spring to store energy and provide power for retracting the cord afterwards.

In some embodiments, a rotary wheel cover is installed on the energy storage chamber;

a seal ring is provided in the rotary wheel cover;

the shaft hole is also provided with a seal ring;

a damping grease is provided in the energy storage chamber; and the seal rings prevent leakage of the damping grease.

In some embodiments, a clamping hole is provided at a sidewall of the rotary wheel cover;

a clamping claw is provided on the sidewall of the energy storage chamber;

the energy storage chamber is clamped fitted with the rotary wheel cover; and the sidewall of the rotary wheel cover is provided with cracks at both sides of the clamping hole, to allow the sidewall to expand outwardly and deform at these positions to fit the clamping claw.

The advantageous effects of the present disclosure are as follows.

In the magnetic attraction type cord winding module of the present disclosure, magnet blocks work cooperatively with the stop button structure, and the magnet block installed on the stop button does not protrude from the upper surface of the stop button, and the magnet block mounted on the rotary wheel is flattened. This design can effectively reduce the height of the stopper structure and thus reduce the space to be occupied, thereby reducing the size of the cord winding module.

In the magnetic attraction type cord winding module of the present disclosure, the damping grease is provided in the energy storage chamber in which the coil spring is disposed. The damping grease can adjust the unwinding speed of the coil spring so that the cord is slowly retracted to avoid damage to the cord.

In the magnetic attraction type cord winding module of the present disclosure, the connection between the cord and the external circuit is realized through the contact type FPC connection terminal and the circuit connection elastic piece, both of which are always elastically contact without being influenced by the rotation of the rotary wheel, and do not affect the circuit signal at all.

Figure 1:
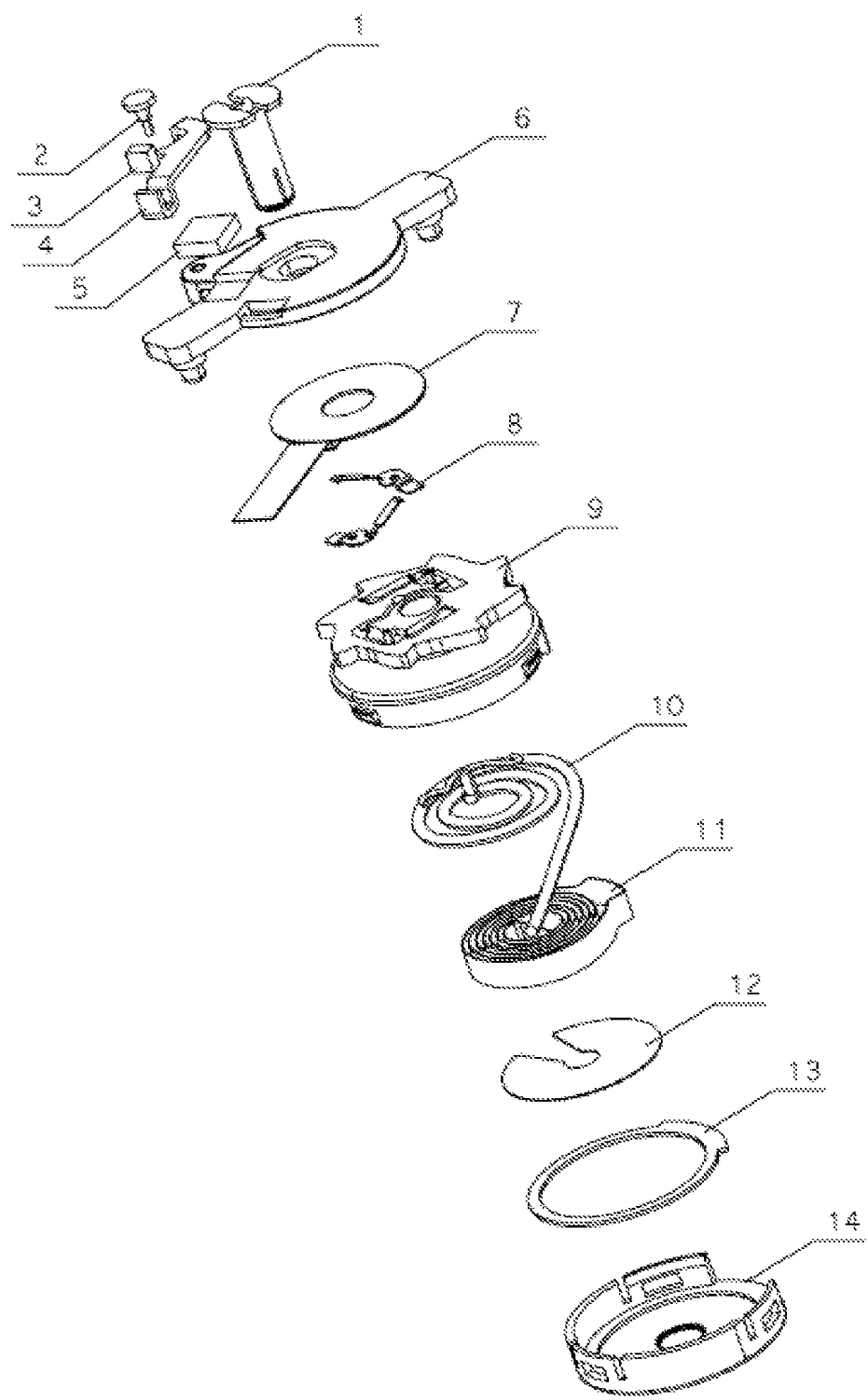
FIG. 1 is an exploded view of the present disclosure, in which each component is in a separate state.

In the drawings: 1: rotating shaft; 2: pin; 3: first magnet; 4: stop button; 5: second magnet; 6: fixing cover; 7: FPC connection terminal; 8: circuit connection elastic piece; 8-1: upper connection terminal; 8-2: lower connection terminal; 8-3: fixing hole; 9: rotary wheel; 9-1: ratchet; 9-2: mounting slot; 9-3: cord spool; 9-4: energy storage chamber; 9-5: clamping claw; 10: cord; 11: coil spring; 12: snap ring; 13: seal ring; and 14: rotary wheel cover.

DETAILED DESCRIPTION

In order to make the objectives, technical solutions and advantages of the present disclosure clearer, the present disclosure is further described in detail with reference to the accompanying drawings and the embodiments.

First Embodiment

FIG. 1, FIG. 2, FIG. 3 and FIG. 4 show an embodiment of the present disclosure. In the present embodiment, a magnetic attraction type cord winding module comprises a rotary wheel 9 with receiving grooves 6-1 on which a cord 10 is wound and a stop button 4 with U-shaped members 4-1 working cooperatively with the rotary wheel 9. The cord winding module further comprises a pair of magnet blocks, namely, a first magnet disposed on the stop button 4 and a second magnet 5 disposed on the rotary wheel 9. The stop button 4 automatically brakes the rotary wheel 9 under the action of the attractive force of the magnet blocks to prevent the rotary wheel 9 from retracting the cord 10.

The magnet blocks are strong magnets.

Alternatively, a repulsive force between the magnet blocks may be utilized. In this case, the first magnet is required to be mounted at the side of the pressing position of the stop button 4, and accordingly the second magnet must be disposed close to the first magnet.

The stop button 4 automatically stops the rotating of the rotary wheel 9 for retracting the cord 10, but it cannot stop the rotating of the rotary wheel 9 for unwinding the cord 10. That is a structural requirement on the cooperation between the stop button 4 and the rotary wheel 9.

When the magnet blocks attract, opposite magnetic poles oppose each other, and when the magnet blocks repel, like magnetic poles oppose each other. The interaction surfaces of the magnet blocks are flat.

Figure 2:
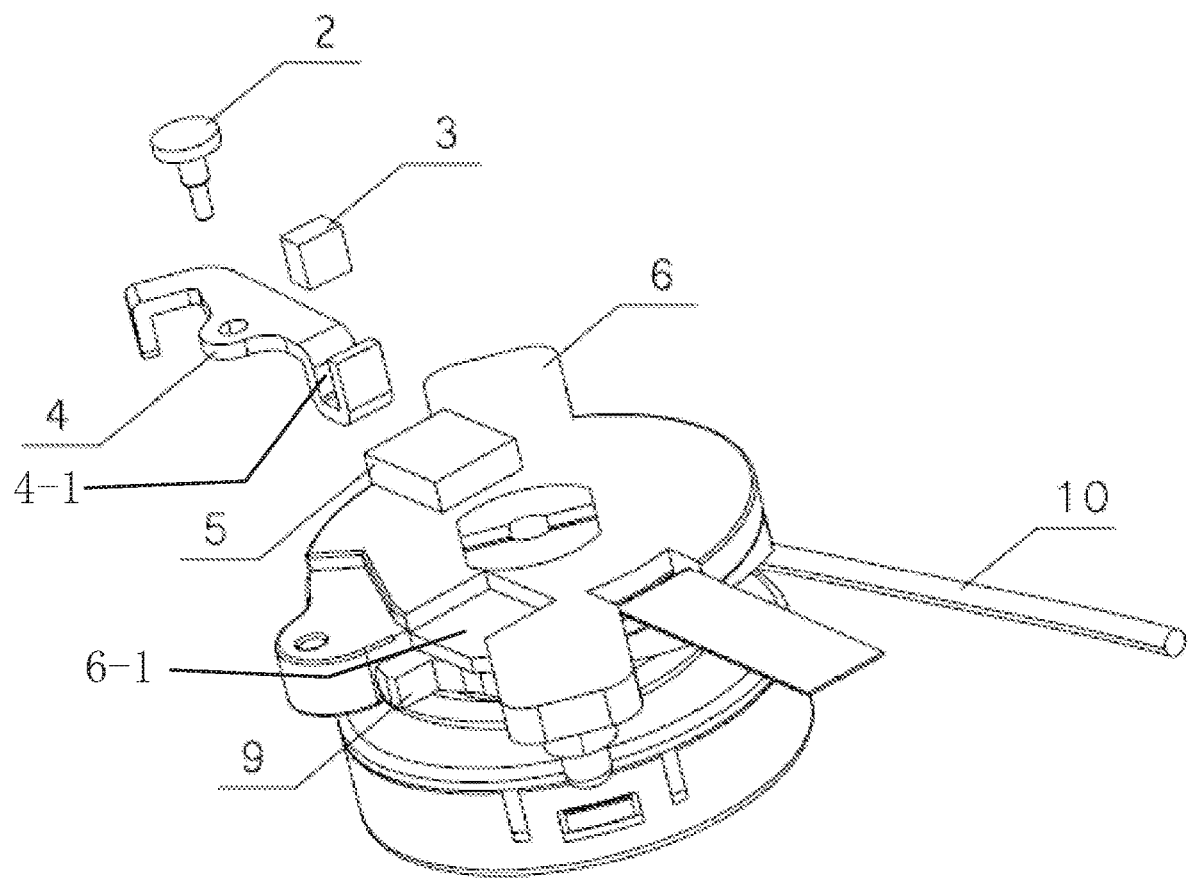
FIG. 2 is an exploded view of the present disclosure, in which a stop button with U-shaped members, a pin, a first magnet and a second magnet are in a separate state from the rotary wheel with receiving grooves.
Figure 3:
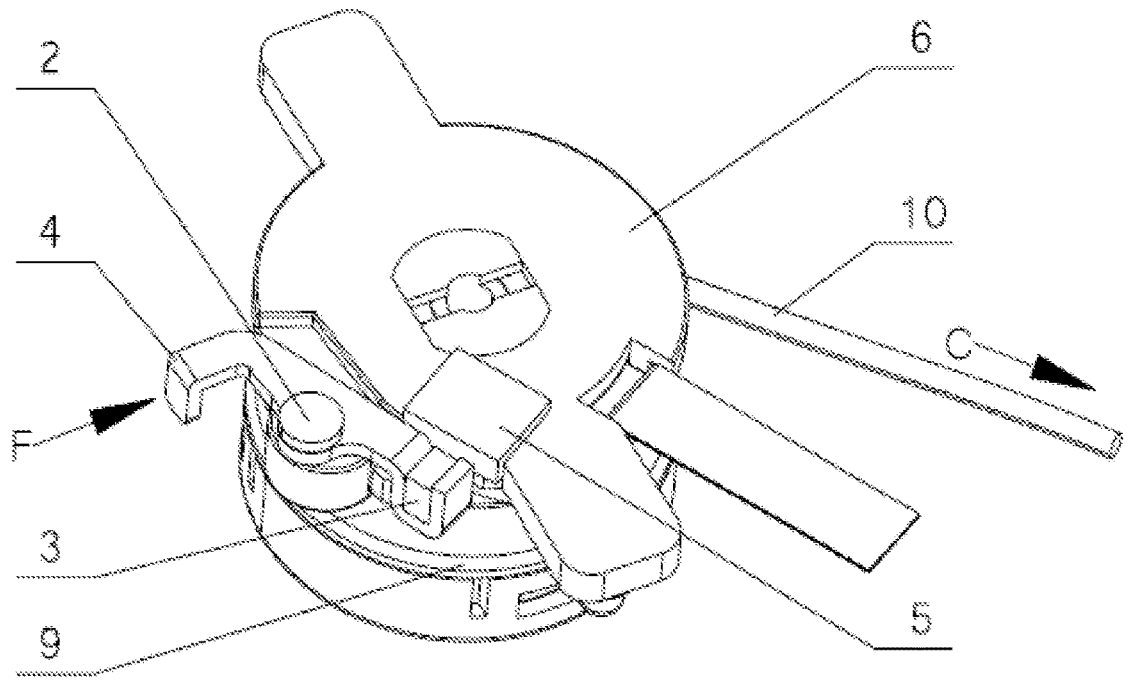
FIG. 3 is an assembly view of all components of the present disclosure.

As shown in FIG. 2 and FIG. 3, the magnet blocks are rectangular blocks.

The cord winding module further comprises a fixing cover 6. The rotary wheel 9 is installed under the fixing cover 6, and the stop button 4 is installed at a side of the fixing cover 6. One or two receiving grooves for mounting corresponding magnet blocks are provided on the body of the fixing cover 6, and the receiving groove has a notch to expose one end of the magnet block mounted therein. Adhesive may be provided to further fix the magnet blocks.

As shown in FIG. 2 and FIG. 3, the stop button 4 is a lever structure, a mounting hole is disposed in the middle of the stop button, the mounting hole is engaged with a pin 2 to mount the stop button at a side of the fixing cover 6, and the stop button 4 rotates around the pin 2. One end of the stop button 4 is provided with a U-shaped member for mounting corresponding magnet blocks. Adhesive may be provided to further fix the magnet blocks.

The stop button 4 may be a metal lever, and the U-shaped member is integrally formed, for example, integrally punched.

By providing the U-shaped member, the first magnet may not protrude from the upper surface of the stop button 4, and the second magnet can be flattened. This design can effectively reduce the height of the stopper structure and thus reduce the space to be occupied.

Figure 4:
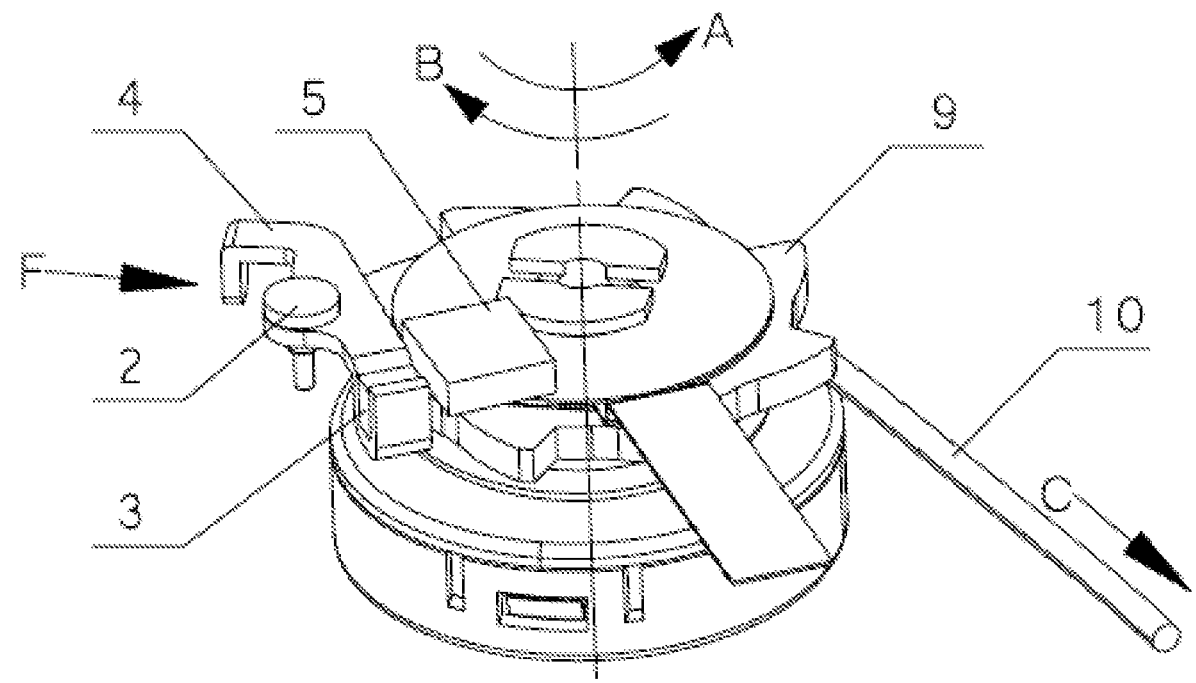
FIG. 4 is an assembly view of all components except a fixing cover of the present disclosure.
Figure 5:
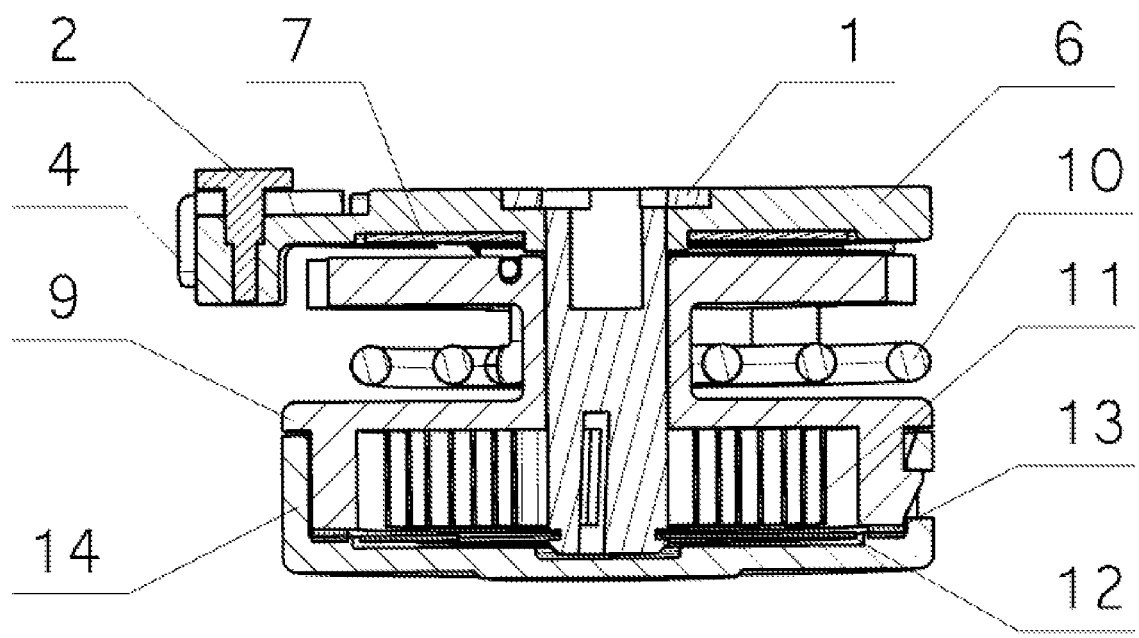
FIG. 5 is a sectional view of the present disclosure.
Figure 6:
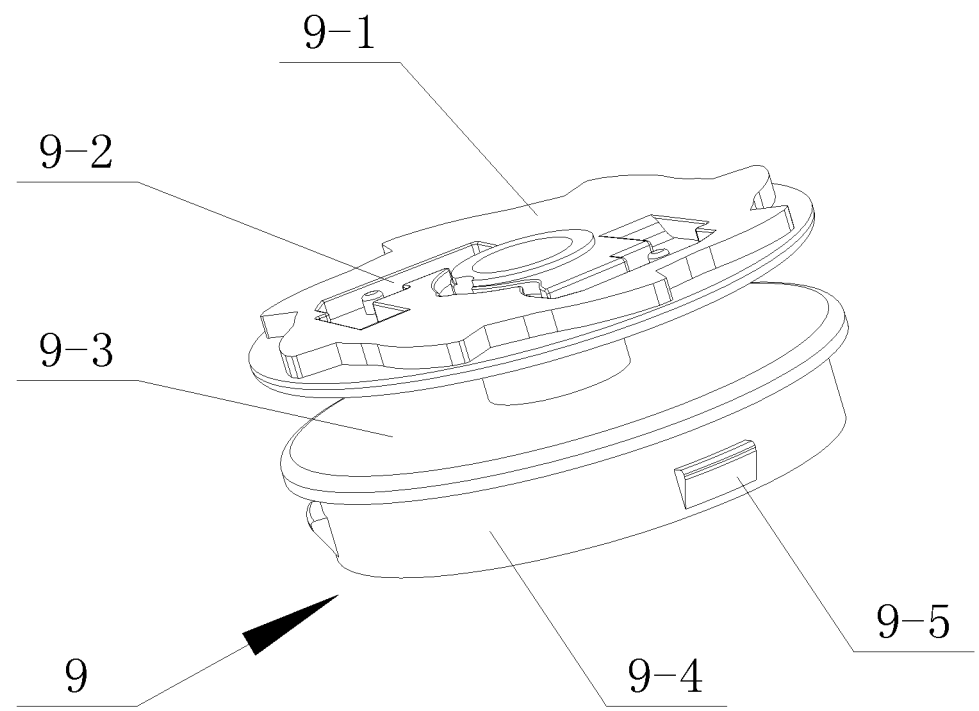
FIG. 6 is a perspective view of a rotary wheel of the present disclosure.

As shown in FIG. 4, FIG. 5 and FIG. 6, a ratchet 9-1 to cooperate with the stop button 4 is mounted on the upper end of the rotary wheel 9, a shaft hole is arranged in the middle of the rotary wheel 9, and a rotating shaft 1 is fixed on the fixing cover 6. The rotary wheel 9 rotates around the rotating shaft 1. A snap ring 12 is arranged at the lower end of the rotating shaft 1, and the rotary wheel is limited on the rotating shaft 1 by the snap ring 12.

When the magnet blocks attract, the stop button 4 is engaged with the ratchet 9-1 through the U-shaped member. At this point, the U-shaped member acts as a ratchet pawl.

If the cord winding module is provided with a pair of mutually repulsive magnet blocks, a ratchet pawl is required to be provided at the other end of the stop button 4 to engage with the ratchet 9-1. The ratchet pawl may have a plastic sleeve. When the rotary wheel 9 rotates to unwind the cord 10, the plastic sleeve acts as a lubricant between the ratchet pawl and the rotary wheel 9.

The detailed structure of the cord winding module is as follows.

As shown in FIG. 1 and FIG. 6, a mounting slot 9-2 is provided at the upper end of the rotary wheel 9. A circuit connection elastic piece 8 is disposed in the mounting slot 9-2. An FPC connection terminal 7 is provided on the lower surface of the fixing cover 6. One end of the circuit connection elastic piece 8 is connected to the cord 10, and the other end is connected to the FPC connection terminal 7. The circuit connection elastic piece 8 is driven by the rotary wheel 9 to rotate with respect to the FPC connection terminal 7.

The FPC connection terminal 7 has a ring shape and is connected with an external flexible printed circuit board (i.e. FPC). The circuit connection elastic piece 8 is two circuit connection elastic pieces 8, and they are symmetrically arranged and in contact with the FPC connection terminal 7. The rotary wheel 9 applies a preload to the FPC connection terminal 7 through the circuit connection elastic pieces 8, so that the reliability of the circuit connection can be fully guaranteed. Both the FPC connection terminal 7 and the circuit connection elastic pieces 8 are made of a material with good electrical conductivity, such as copper alloy.

A cord is connected between the two circuit connection elastic pieces 8, and the cord is connected to the cord 10.

Figure 7:
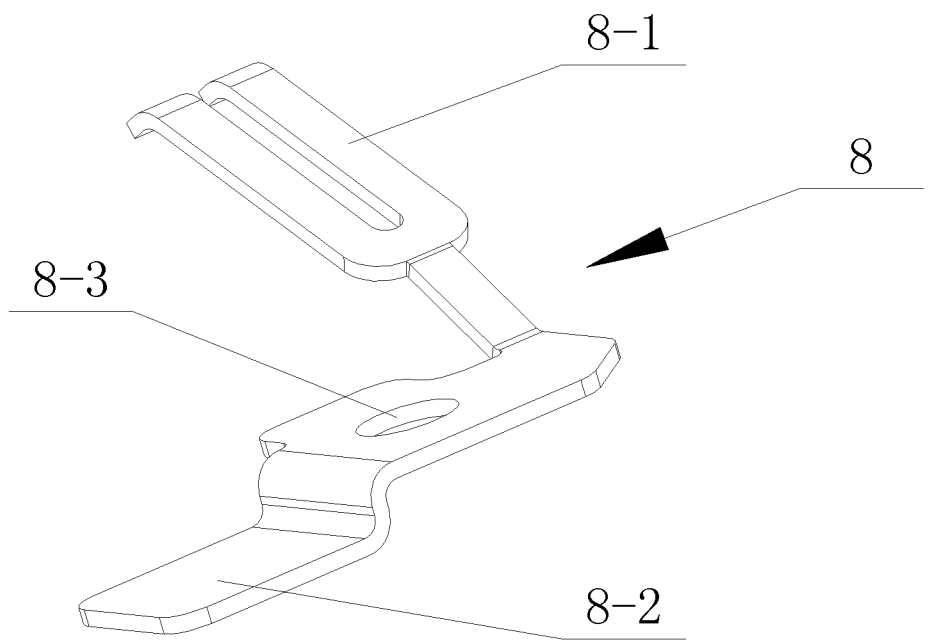
FIG. 7 is a perspective view of a circuit connection elastic piece of the present disclosure.

As shown in FIG. 7, the ends of the circuit connection elastic pieces 8 which contact the FPC connection terminal 7 have a fork structure (upper connection terminal 8-1 in FIG. 7) and has an arc segment. The circuit connection elastic pieces 8 are connected to the FPC connection terminal 7 through the arc segment, thereby reducing the friction in sliding.

A fixing hole 8-3 is arranged in the middle of the circuit connection elastic piece 8. Correspondingly, a pin is arranged in the mounting slot 9-2 to cooperate with the fixing hole 8-3. With this design, the circuit connection elastic piece 8 can more stably rotate with respect to the FPC connection terminal 7.

An energy storage chamber 9-4 is provided at the lower end of the rotary wheel 9. A coil spring 11 is installed in the energy storage chamber 9-4. One end of the coil spring 11 is fixed on the rotating shaft 1, and the other end is fixed on the sidewall of the energy storage chamber. When the cord 10 is pulled out, the rotary wheel 9 rotates, and the coil spring 11 is tightened to store energy and provide power for retracting the cord 10 afterwards.

A rotary wheel cover 14 is installed on the energy storage chamber 9-4.

A clamping hole is provided at a sidewall of the rotary wheel cover 14. A clamping claw 9-5 is provided on the sidewall of the energy storage chamber 9-4. The energy storage chamber 9-4 is clamped fitted to the rotary wheel cover 14. The sidewall of the rotary wheel cover 14 is provided with cracks at both sides of the clamping hole, to allow the sidewall to expand outwardly and deform at these positions to fit the clamping claw 9-5.

When the cord winding module is used, due to the attractive force or repulsive force between the magnet blocks, the stop button 4 is always subject to a pushing force in the opposite direction to the pressing force F, so that one end of the stop button 4 keeps the trend of inserting into the teeth of the ratchet 9-1.

In a normal state, the rotary wheel 9 can rotate clockwise in the direction of the arrow B, and cannot rotate anticlockwise in the direction of the arrow A due to the braking of the stop button 4.

When the cord 10 is pulled in the direction of the arrow C in FIG. 4, the rotary wheel 9 rotates clockwise in the direction of the arrow B, and the coil spring 11 is wound in the opposite direction so that the rotary wheel 9 is inclined to rotate anticlockwise in the direction of the arrow A. When the cord 10 is not pulled any longer, due to the action of the stopper structure, one end of the stop button 4 inserts into the teeth of the ratchet 9-1 to prevent the rotary wheel 9 from rotating anticlockwise in the direction of the arrow A. When a force F is applied on the end of the stop button 4, the one end of the stop button 4 moves outwardly and disengages from the teeth of the ratchet 9-1, the rotary wheel 9 rotates anticlockwise in the direction of the arrow A due to the action of the coil spring 11, and the cord 10 is retracted into the cord spool 9-3 of the rotary wheel.

Second Embodiment

As a second embodiment of the present disclosure, a further improvement is made on the basis of the first embodiment. In the second embodiment, a second pair of magnet blocks (not shown), namely, a third magnet disposed on the stop button and a fourth magnet disposed on the rotary wheel, are provided on the stop button. The third magnet and the fourth magnet generate a repulsive force or an attractive force.

Correspondingly, U-shaped members are provided at the two ends of the stop button to mount corresponding magnet blocks.

The force applied on the rotary wheel by the stop button can be significantly increased by providing two pairs of magnet blocks, and thus the reliability of the cooperation between them can be ensured.

Third Embodiment

As a third embodiment of the present disclosure, a further improvement is made on the basis of the first embodiment. As shown in FIG. 5 and FIG. 6, a rotary wheel cover 14 is installed on an energy storage chamber 9-4, and a seal ring 13 is provided inside the rotary wheel cover 14. A damping grease is provided in the energy storage chamber 9-4. The seal ring 13 prevents leakage of the damping grease.

The damping grease can adjust the unwinding speed of the coil spring 11 so that the cord 10 can be slowly retracted to avoid damage to the cord 10.

Fourth Embodiment

In a fourth embodiment of the present disclosure, the number of the circuit connection elastic piece is one (not shown), and actually it is obtained by integrally forming two circuit connection elastic pieces 8 in the first embodiment into one piece. The other structures such as the fork structure are the same except that they are integrally punched and are connected to the cord 10 in the middle of it. This design can simplify the assembling process of the circuit connection portion.

The above description is merely preferable embodiments of the present disclosure. Based on the above teachings of the present disclosure, those skilled in the art may make other improvements or modifications on the basis of the foregoing embodiments. It should be understood by those skilled in the art that the above specific description is only for better explaining the present disclosure, and the protection scope of the present disclosure should be determined by the protection scope of the claims.

What is claimed is:

1. A magnetic attraction type cord winding module, comprising a rotary wheel on which a cord is wound and a stop button working cooperatively with the rotary wheel, wherein the cord winding module further comprises at least one pair of magnet blocks, the at least one pair of magnet blocks comprise a first magnet disposed on the stop button and a second magnet disposed on the rotary wheel, and the stop button automatically brakes the rotary wheel under the action of an attractive force or a repulsive force of the magnet blocks and prevents the rotary wheel from retracting the cord;

wherein the stop button is a lever structure, and one or both ends of the stop button are provided with a U-shaped member or U-shaped members for mounting corresponding magnet blocks, and a ratchet to cooperate with the stop button is mounted on an upper end of the rotary wheel.

2. The cord winding module according to claim 1, wherein when the magnet blocks attract, opposite magnetic poles oppose each other, and when the magnet blocks repel, like magnetic poles oppose each other; and interaction surfaces of the magnet blocks are flat.

3. The cord winding module according to claim 1, wherein the magnet blocks are rectangular blocks or cylinders.

4. The cord winding module according to claim 1, further comprising a fixing cover, wherein the rotary wheel is installed under the fixing cover, the stop button is installed at a side of the fixing cover, one or two receiving grooves for mounting corresponding magnet blocks are provided on the body of the fixing cover, and the receiving grooves have a notch, and one end of the magnet blocks mounted in the receiving grooves is exposed from the notch.

5. The cord winding module according to claim 4, wherein a mounting hole is disposed in the middle of the stop button, the mounting hole is engaged with a pin to mount the stop button at a side of the fixing cover, the stop button rotates around the pin.

6. The cord winding module according to claim 5, wherein the stop button is a metal lever, and the U-shaped member is integrally formed.

7. The cord winding module according to claim 1, wherein a shaft hole is arranged in the middle of the rotary wheel, and a rotating shaft is fixed on the fixing cover; and the rotary wheel rotates around the rotating shaft, a snap ring is arranged at a lower end of the rotating shaft, and the rotary wheel is limited on the rotating shaft by the snap ring.

8. The cord winding module according to claim 7, wherein when the magnet blocks attract, the stop button is engaged with the ratchet through the U-shaped member.

9. The cord winding module according to claim 7, further comprising a pair of mutually repulsive magnet blocks, one magnet block is mounted on one end of the stop button, and a ratchet pawl is provided on the other end of the stop button to engage with the ratchet.

* * * * *